US009415491B1

(12) United States Patent
Hewitt et al.

(10) Patent No.: US 9,415,491 B1
(45) **Date of Patent: *Aug. 16, 2016**

(54) APPARATUS FOR RAPID INSTALLATION OF THREADED FASTENERS

(71) Applicant: RDA Werks, LLC, Clayton, NC (US)

(72) Inventors: Dana Joseph Hewitt, Clayton, NC (US); James Ryan Stone, Clayton, NC (US); Stephen Andrew Miller, Clayton, NC (US)

(73) Assignee: RDA Werks, LLC, Clayton, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,833

(22) Filed: Nov. 17, 2014

Related U.S. Application Data

(60) Provisional application No. 62/017,289, filed on Jun. 26, 2014.

(51) Int. Cl.

| | |
|---|---|
| ***B25B 15/02*** | (2006.01) |
| ***B25B 23/10*** | (2006.01) |
| ***B25B 23/12*** | (2006.01) |
| ***B23B 23/00*** | (2006.01) |

(52) U.S. Cl.
CPC ............. *B25B 23/105* (2013.01); *B23B 23/005* (2013.01); *B25B 23/12* (2013.01); *B25B 15/02* (2013.01); *B25B 23/101* (2013.01)

(58) Field of Classification Search
CPC ........ B25B 23/101; B25B 23/10; B25B 15/02
USPC .............. 81/457, 452, 454, 458; D8/456, 457
See application file for complete search history.

(56) References Cited

U.S. PATENT DOCUMENTS

| | | | | | |
|---|---|---|---|---|---|
| 701,941 | A | * | 6/1902 | Rowlands ........................ | 81/451 |
| 772,912 | A | | 4/1904 | Allam | |
| 1,333,437 | A | | 3/1920 | Monroe | |
| 1,497,642 | A | * | 6/1924 | Rowe .............................. | 81/453 |
| 2,756,791 | A | | 7/1956 | Ferrara | |
| 2,780,257 | A | | 2/1957 | Duggan | |
| 3,244,208 | A | | 4/1966 | McKenzie | |
| 4,221,249 | A | | 9/1980 | Mazzeo et al. | |
| 4,287,923 | A | | 9/1981 | Hornung | |
| 4,736,658 | A | | 4/1988 | Jore | |
| 4,895,016 | A | * | 1/1990 | Cameron et al. ........... | 73/114.64 |
| 5,458,030 | A | * | 10/1995 | Betts ............................... | 81/451 |

(Continued)

OTHER PUBLICATIONS

"Compact Magnetic Drive Guide" www.toolbarn.com/dewalt-dw2054b.html?gclid=CO-xj9qPgb8CFVIPMgodjxwANg, Last accessed Jun. 17, 2014, 2 Pages.

*Primary Examiner* — Hadi Shakeri
*Assistant Examiner* — Danny Hong
(74) *Attorney, Agent, or Firm* — NK Patent Law, PLLC

(57) ABSTRACT

An apparatus for rapid installation of threaded fasteners is provided. The apparatus includes a drive portion configured for being received by a rotary tool, a bit holder extending from the drive portion and configured for receiving a tool bit, the bit holder defining an elongate portion, and a sleeve configured for translatable movement along the elongate portion. The sleeve has a first extended position in which an end of the sleeve extends substantially beyond the tool bit and a retraction position in which the sleeve does not enclose the tool bit. A spring biases the sleeve into the extended position. Pressing of an end of the sleeve against a working surface imparts translation of the sleeve in a direction from the extended position towards the retracted position.

13 Claims, 5 Drawing Sheets

(56) References Cited

U.S. PATENT DOCUMENTS

| | | | | |
|---|---|---|---|---|
| 5,992,274 | A * | 11/1999 | Lammers | 81/451 |
| 6,128,982 | A * | 10/2000 | Gwin, Sr. | 81/452 |
| 6,244,141 | B1 | 6/2001 | Han | |
| 6,530,299 | B1 | 3/2003 | Liu | |
| 6,668,941 | B2 * | 12/2003 | Phillips et al. | 173/93.5 |
| 7,175,185 | B2 | 2/2007 | Chen | |
| 2002/0166421 | A1 * | 11/2002 | Bowerman | 81/451 |
| 2003/0098169 | A1 * | 5/2003 | Phillips et al. | 173/93.5 |
| 2010/0294093 | A1 * | 11/2010 | Tanger | 81/452 |

* cited by examiner

APPARATUS FOR RAPID INSTALLATION OF THREADED FASTENERS

CROSS-REFERENCE TO RELATED APPLICATIONS

This application claims priority to U.S. Provisional Patent Application No. 62/017,289 filed on Jun. 26, 2014, the entire contents of which are hereby incorporated by reference.

TECHNICAL FIELD

The present disclosure relates to a bit holder for installing threaded fasteners.

BACKGROUND

Installation of threaded fasteners is usually accomplished with a rotary based driver, such as an electric screwdriver or impact gun, in which a bit is engaged with the threaded fasteners and rotated by the rotary based driver into threaded engagement with a working surface.

For downward vertical fastening, the downward pressure on the threaded fastener is suitable for maintaining the threaded fastener in position while it is being threaded into the working surface. However, for horizontal fastening or upwards fastening, the threaded fastener can oftentimes slip out of engagement with the bit. In order to combat these issues, many times the installer will have to hold the threaded fastener in place or start the threading process slowly until the fastener is sufficiently sunk into the working surface to maintain its position.

Certain devices have been developed that employ a sleeve that extends from the drive bit. The sleeve is advantageous as it provides support to the threaded fastener to maintain the threaded fastener relative to the tool bit until the fastener can be sunk into the working surface. However, the sleeve must be manually moved in and between an extended and a retracted position by the user, thus causing unnecessary operator involvement.

Improved and convenient refilling devices and methods are needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, an apparatus for rapid installation of threaded fasteners is provided. The apparatus includes a drive portion configured for being received by a rotary tool, a bit holder extending from the drive portion and configured for receiving a tool bit, the bit holder defining an elongate portion, a sleeve partially enclosing a circumference of the elongate portion and configured for translatable movement along the elongate portion. The sleeve has a first extended position in which an end of the sleeve extends substantially beyond the tool bit and a retraction position in which the sleeve does not enclose the tool bit. A spring biases the sleeve into the extended position. Pressing of an end of the sleeve against a working surface imparts translation of the sleeve in a direction from the extended position towards the retracted position.

According to one or more embodiments, the spring is a coil spring that extends around a circumference of the elongate portion.

According to one or more embodiments, a threaded fastener received within the sleeve is substantially covered by the sleeve when the sleeve is in the extended position.

According to one or more embodiments, the bit holder is magnetic.

According to one or more embodiments, the apparatus includes a collar to which one end of the spring is engaged to in order to secure the spring to the elongate portion.

According to one or more embodiments, a second end of the spring is engaged with the sleeve.

According to one or more embodiments, the sleeve is transparent for allowing viewing of the fastener therein.

According to one or more embodiments, the sleeve is made of a polymer, non-scratch material such as Delrin.

According to one or more embodiments, the apparatus includes a cylinder extending around a spring encircling the elongate portion, the cylinder being fixed relative to the elongate portion.

According to one or more embodiments, the locking assembly includes a slot defined in the cylinder and a post extending from the sleeve. The locking assembly is locked such that the sleeve is in the retracted position by positioning the post into the slot.

According to one or more embodiments, the sleeve further defines a stop shoulder on an end thereof for resting against a working surface during drilling.

According to one or more embodiments, a method of installing threaded fasteners onto a generally vertical or overhead surface is provided. The method includes using an apparatus that includes a bit holder and a sleeve with an extended position in which an end of the sleeve extends substantially beyond the bit holder and a retracted position in which the sleeve exposes an end of the tool bit. In this method, the sleeve is biased in the extended position by a spring. The method includes retracting the sleeve into the retracted position and placing a threaded fastener into engagement with the tool bit. The method includes extending the sleeve into the extended position and imparting rotational movement to the threaded fastener to sink the fastener into a working surface.

The method of claim 12, wherein the apparatus includes a locking assembly configured for locking the sleeve relative to the elongate portion in the retracted position, wherein retracting the sleeve into the retracted position with the locking assembly further includes locking the sleeve in the retracted position with the locking assembly.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
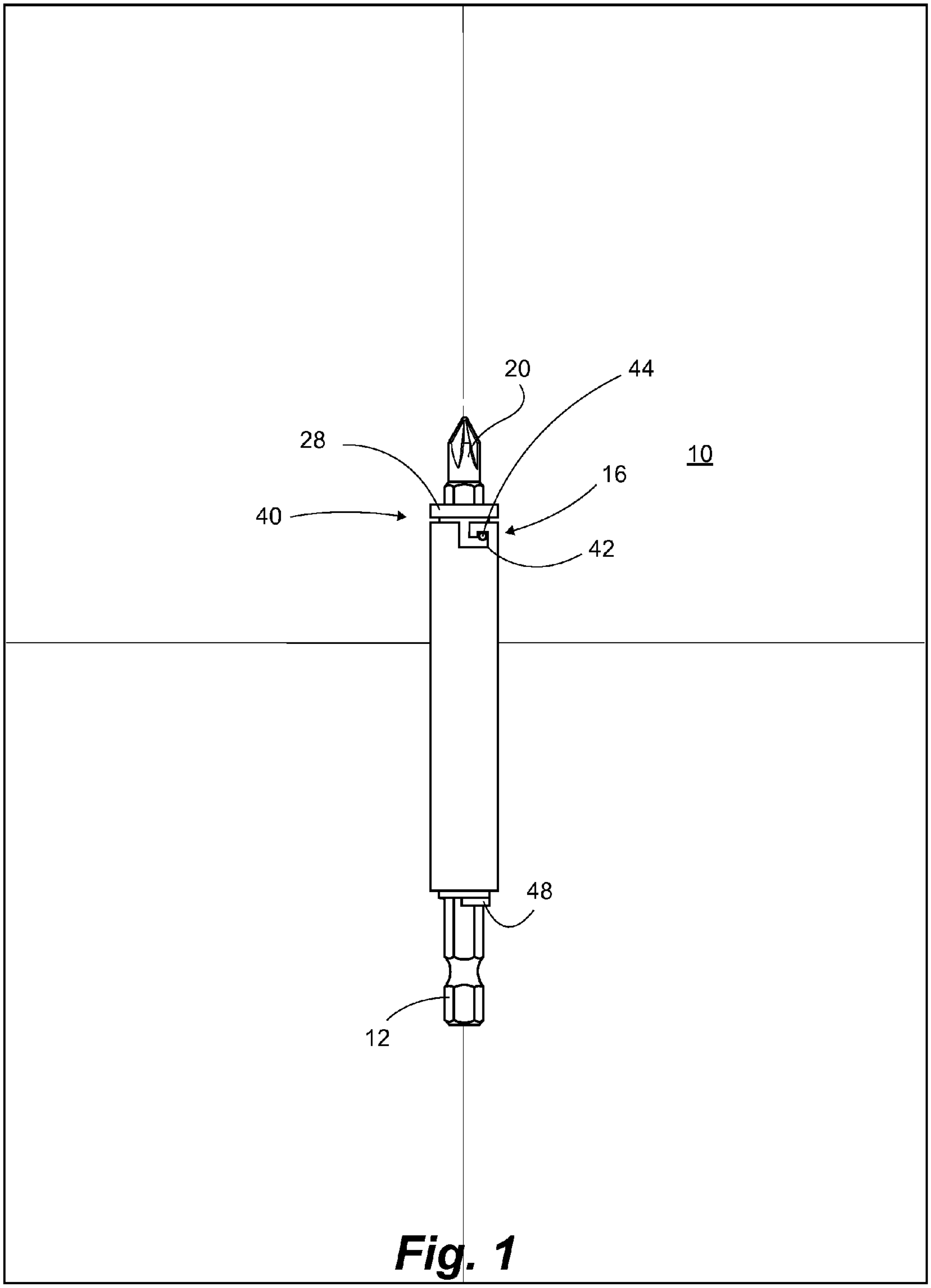
FIG. 1 is a side view of the apparatus described herein in a retracted position without having a fastener installed therein according to one or more embodiments described herein.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

An apparatus for rapid installation of threaded fasteners is provided and generally designated 10. The apparatus 10 includes a drive portion 12 configured for being received by a rotary tool. The rotary tool may be any appropriately configured tool, including an electric or battery powered drill, an impact gun, and the like. The apparatus 10 may further include a bit holder 16 extending from the drive portion 12 and configured for receiving a tool bit 20. The bit holder 16 defines an elongate portion 22 that is received within a cylinder 18.

Figure 2A:
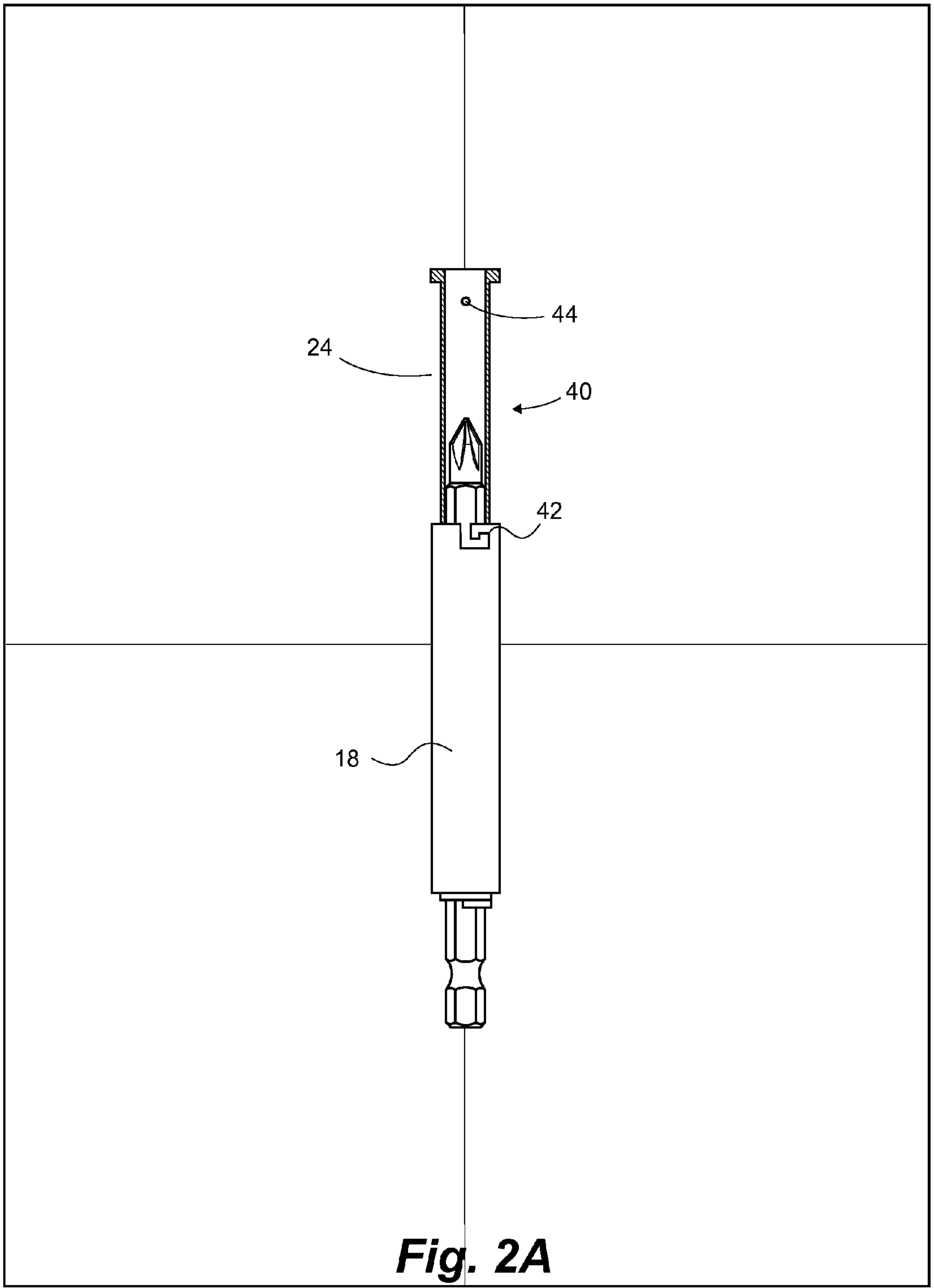
FIG. 2A is a side view of the apparatus described herein in a first, extended position.
Figure 2B:
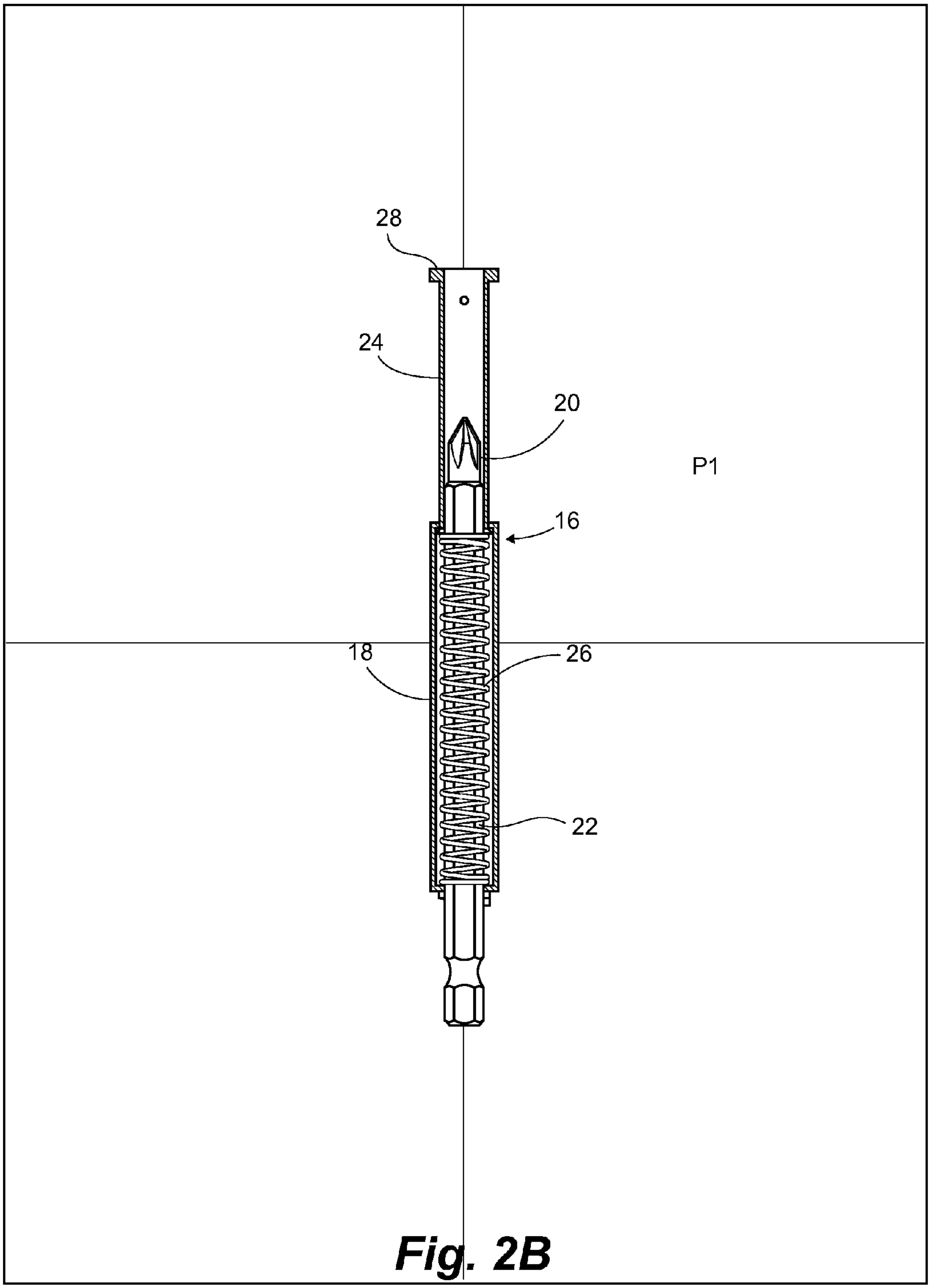
FIG. 2B is a partial cross-sectional side view of the apparatus described herein in the extend position according to one or more embodiments described herein.
Figure 3:
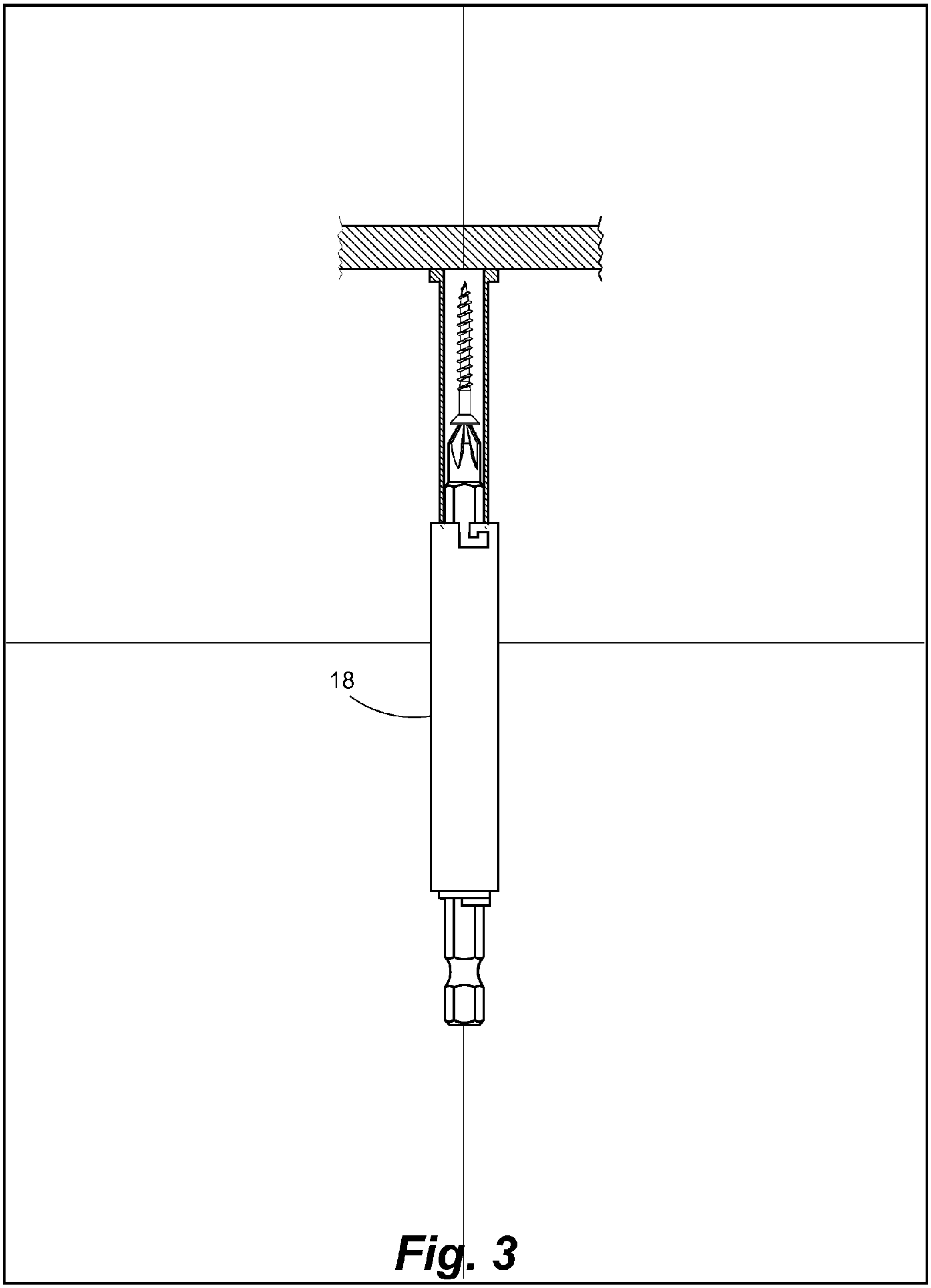
FIG. 3 is a side view of the apparatus described herein having a fastener installed therein according to one or more embodiments described herein where the sleeve is positioned against the working surface.
Figure 4:
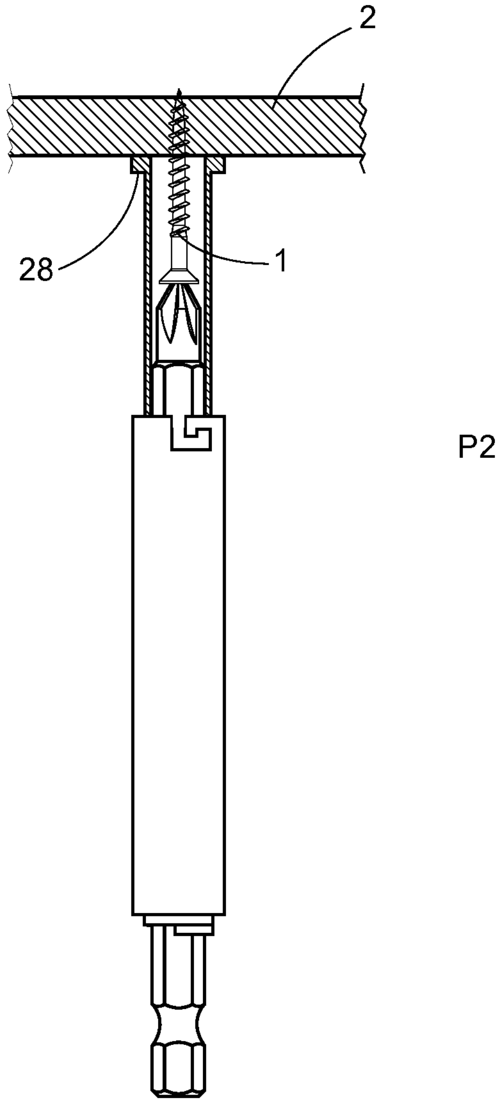
FIG. 4 is a side view of the apparatus described herein having a fastener installed therein according to one or more embodiments described herein where the fastener is being sunk into a working surface and the sleeve is partially translated from the extended position into the retracted position.

A sleeve 24 partially encloses a circumference of the elongate portion 22 and is configured for translatable movement along the elongate portion 22. With further reference to FIG. 2A, the sleeve 24 has a first extended position P1 in which an end of the sleeve 24 extends substantially beyond the tool bit and a fastener 1 received within the sleeve 24, and, with reference to FIG. 1, a second, retracted position P2 in which the sleeve 24 does not substantially enclose the fastener 1 and the sleeve 24 is shown in a locked position.

A spring 26 biases the sleeve 24 into the extended position P1. Pressing of an end of the sleeve 24 against a working surface 1 imparts translation of the sleeve 24 in a direction from the extended position P1 towards the retracted position P2. In this manner, as the fastener 1 is sunk deeper into the working surface 2, the end of the sleeve 24 maintains engagement about the working surface 2, thus ensuring that the fastener 1 remains either within the sleeve or sunk into the working surface 2.

In one or more embodiments, the spring 26 is a coil spring that extends around a circumference of the elongate portion 22.

In one or more embodiments, the threaded fastener 1 received within the sleeve 24 is substantially covered by the sleeve 24 when the sleeve 24 is in the extended position.

In one or more embodiments, the bit holder 16 is magnetic.

In one or more embodiments, the apparatus includes a collar 48 to which one end of the spring 26 is engaged to in order to secure the spring 26 to the elongate portion.

In one or more embodiments, a second end of the spring 26 is engaged with the sleeve.

In one or more embodiments, the sleeve 24 is transparent for allowing viewing of the fastener therein.

In one or more embodiments, the sleeve 24 is made of a polymer, non-scratch material such as Delrin®.

A locking assembly 40 is configured for locking the sleeve 24 relative to the elongate portion 22. When the sleeve 24 is in the retracted position P2, the locking assembly 40 locks the sleeve 24 relative to the elongate portion 22. The locking assembly 40 may include a cylinder 18 that encircles the elongate portion 22 and the spring 26. The cylinder 18 may define a slot 42. A post 44 may extend from sleeve 24 and is configured for being received within slot 42 in order to lock the locking assembly 40 such that the apparatus 10 is in the retracted position P2. The apparatus 10 is shown in the retracted position P2 in FIG. 1.

Locking assembly 40 may also advantageously provide for use of apparatus 10 without the sleeve 24 extended. In this manner, for drilling or sinking of threaded fasteners onto a surface downward of the drill or in some vertical installations where the support of sleeve 24 is not required and the apparatus 10 can be used as a more conventional bit holder.

Additionally, locking assembly 40 may be provided for allowing ease of installation of bit 20 within the bit holder. In this manner, any time the user needs to swap out bit 20 for a different bit, the locking assembly 40 may be locked to place the sleeve 24 in the retracted position and a bit 20 installed within the bit holder.

The sleeve 24 may further define a stop shoulder 28 on an end thereof for resting against a working surface during drilling.

In operation, the fastener 1 is loaded into engagement with the bit 20 and in this engagement, the fastener 1 is received within the sleeve 24. The apparatus 10 is then placed proximal a working surface 2, which may be a vertical, horizontal, or angled surface. The apparatus 10 is particularly useful with vertical surfaces, or overhead horizontal or angled surfaces. If the end of the sleeve 24 extends beyond the end of the fastener, the sleeve 24 is translated towards the rotary tool by pressing the sleeve 24 against the working surface. The rotary tool is then activated to impart rotation movement with the thread direction of the fastener 1. The fastener 1 begins to countersink into the working surface 1 and as the bit 20 is advanced closer to the working surface, movement of the sleeve 24 continues towards the rotary tool. Once the fastener 1 is completely sunk into the working surface 1, the apparatus 10 is pulled away from the working surface and the sleeve 24 returns to the extended position P2.

A bit driver 18 is provided as part of drive portion 12 and is configured for being engaged with any rotary tool such as a rotary drill, impact gun, and the like.

A method of installing threaded fasteners onto a generally vertical or overhead surface is thus disclosed. The method may include using apparatus 10 that includes the bit holder 16 and sleeve 24 with the extended position in which an end of the sleeve 24 extends substantially beyond the bit holder 16 and the retracted position in which the sleeve 24 exposes an end of the tool bit. The method may include retracting the sleeve into the retracted position as illustrated in FIG. 1. The method may include placing the threaded fastener 1 into engagement with the tool bit and then extending the sleeve 24 into the extended position by unlocking the locking mechanism 40 to allow the sleeve 24 to bias towards the extended position P1 illustrated in FIG. 2A. Fastener 1 may then be positioned into engagement with the tool bit by positioning the fastener 1 in the sleeve 24. The method may then include imparting rotational movement to the threaded fastener to sink the fastener 1 into a working surface 2.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. An apparatus for rapid installation of threaded fasteners, comprising:

- a drive portion configured for being received by a rotary tool;
- a bit holder extending from the drive portion and configured for receiving a tool bit, the bit holder defining an elongate portion;
- a sleeve configured for translatable movement along the elongate portion,
- a locking assembly carried by the sleeve and configured for locking the sleeve relative to the elongate portion;
- a cylinder extending outwardly around the sleeve that is rotatable relative to the elongate portion;
- wherein the sleeve has an extended position in which an end of the sleeve extends substantially beyond the tool bit and a retracted position in which the sleeve does not enclose the tool bit and the sleeve is locked relative to the elongate portion by the locking assembly,
- wherein a spring biases the sleeve into the extended position,
- wherein the sleeve is placed in the locked position by rotation of the cylinder into engagement with the locking assembly, wherein pressing of an end of the sleeve against a working surface imparts translation of the sleeve in a direction from the extended position towards the retracted position, wherein the sleeve is rotatable 360 degrees relative to the drive portion.

2. The apparatus of claim 1, wherein the spring is a coil spring that extends around a circumference of the elongate portion.

3. The apparatus of claim 1, wherein a threaded fastener received within the sleeve is substantially covered by the sleeve when the sleeve is in the extended position.

4. The apparatus of claim 1, wherein the bit holder is magnetic.

5. The apparatus of claim 1, further including a collar to which one end of the spring is engaged to in order to secure the spring to the elongate portion.

6. The apparatus of claim 5, wherein a second end of the spring is engaged with the sleeve.

7. The apparatus of claim 1, wherein the sleeve is transparent for allowing viewing of the fastener therein.

8. The apparatus of claim 1, wherein the sleeve is made of a polymer, non-scratch material.

9. The apparatus of claim 1, further including a cylinder extending around the spring, wherein the spring encircles the elongate portion, the cylinder being fixed relative to the elongate portion.

10. The apparatus of claim 9, wherein the locking assembly comprises a slot defined in the cylinder and a post extending from the sleeve, wherein the locking assembly is locked such that the sleeve is in the retracted position by positioning the post into the slot.

11. The apparatus of claim 10, wherein the sleeve further defines a stop shoulder on an end thereof for resting against a working surface during drilling.

12. A method of installing threaded fasteners onto a generally vertical or overhead surface, the method including:

- using an apparatus that includes a bit holder and a sleeve with an extended position in which an end of the sleeve extends substantially beyond the bit holder and a retracted position in which the sleeve exposes an end of the tool bit and further includes a cylinder extending circumferentially around the sleeve that is configured to selectively engage with a post extending from the sleeve, the sleeve being biased in the extended position by a spring;
- retracting the sleeve into the retracted position and locking the sleeve into the retracted position by rotating the cylinder until the post extending from the sleeve is engaged therewith;
- placing a threaded fastener into engagement with the tool bit; extending the sleeve into the extended position by rotating the cylinder until the post extending from the sleeve is not engaged therewith; and imparting rotational movement to the threaded fastener to sink the fastener into a working surface, wherein the sleeve is rotatable 360 degrees relative to a drive portion; wherein the apparatus includes a locking assembly configured for locking the sleeve relative to the elongate portion in the retracted position, wherein retracting the sleeve into the retracted position with the locking assembly further includes locking the sleeve in the retracted position with the locking assembly.

13. A method of installing threaded fasteners onto a generally vertical or overhead surface, the method including:

- using an apparatus that includes a bit holder and a sleeve with an extended position in which an end of the sleeve extends substantially beyond the bit holder and a retracted position in which the sleeve exposes an end of the tool bit and further includes a cylinder extending circumferentially around the sleeve that is configured to selectively engage with a post extending from the sleeve, the sleeve being biased in the extended position by a spring;
- retracting the sleeve into the retracted position and locking the sleeve into the retracted position by rotating the cylinder until the post extending from the sleeve is engaged therewith;
- placing a threaded fastener into engagement with the tool bit; extending the sleeve into the extended position by rotating the cylinder until the post extending from the sleeve is not engaged therewith; and imparting rotational movement to the threaded fastener to sink the fastener into a working surface, wherein the sleeve is rotatable 360 degrees relative to a drive portion; wherein the apparatus includes: a drive portion configured for being received by a rotary tool; wherein the bit holder extends from the drive portion and is configured for receiving a tool bit, the bit holder defining an elongate portion; wherein the sleeve is configured for translatable movement along the elongate portion, a locking assembly configured for locking the sleeve relative to the elongate portion; wherein the sleeve is in the extended position in which an end of the sleeve extends substantially beyond the tool bit and in the retracted position in which the sleeve does not enclose the tool bit and the sleeve is locked relative to the elongate portion by the locking assembly, wherein a spring biases the sleeve into the extended position, whereby pressing of an end of the sleeve against a working surface imparts translation of the sleeve in a direction from the extended position towards the retracted position.

* * * * *